US005486686A

United States Patent [19]
Zdybel, Jr. et al.

[11] Patent Number: 5,486,686
[45] Date of Patent: Jan. 23, 1996

[54] HARDCOPY LOSSLESS DATA STORAGE AND COMMUNICATIONS FOR ELECTRONIC DOCUMENT PROCESSING SYSTEMS

[75] Inventors: Frank Zdybel, Jr., Palo Alto; Henry W. Sang, Jr., Cupertino; Jan O. Pederson, Palo Alto; Z. E. Smith, III, Palo Alto; D. A. Henderson, Jr., Palo Alto; David L. Hecht, Palo Alto; Dan S. Bloomberg, Palo Alto, all of Calif.

[73] Assignee: Xerox Corporation, Stamford, Conn.

[21] Appl. No.: 887,563

[22] Filed: May 18, 1992

Related U.S. Application Data

[63] Continuation of Ser. No. 530,677, May 30, 1990, abandoned.

[51] Int. Cl.⁶ .................................................. G06F 15/20
[52] U.S. Cl. ............................................ 235/375; 235/432
[58] Field of Search .................................. 235/470, 432, 235/494, 456, 454, 375; 355/202, 204; 382/61, 56; 358/470; 364/523; 395/109

[56] References Cited

U.S. PATENT DOCUMENTS

| | | | |
|---|---|---|---|
| 4,322,157 | 3/1982 | Miura et al. | 364/523 |
| 4,488,679 | 12/1984 | Bockholt et al. | 235/469 |
| 4,494,862 | 1/1985 | Tanaka | 355/14 |
| 4,521,096 | 6/1985 | Suganuma et al. | 364/523 |
| 4,660,221 | 4/1987 | Dlugos | 235/432 X |
| 4,728,984 | 3/1988 | Daniele | 355/6 |
| 4,795,894 | 1/1989 | Sugimoto et al. | 235/468 |
| 4,970,554 | 11/1990 | Rourke | 355/202 |
| 5,033,106 | 7/1991 | Kita | 382/56 |
| 5,051,779 | 9/1991 | Hikawa | 235/462 |
| 5,129,011 | 7/1992 | Nishikawa et al. | 382/56 |
| 5,140,139 | 8/1992 | Shepard | 235/454 |
| 5,222,157 | 6/1993 | Yomeda et al. | 382/61 |

FOREIGN PATENT DOCUMENTS

| | | |
|---|---|---|
| 61-183792 | 8/1986 | Japan . |
| WO8910601 | 11/1989 | WIPO . |

OTHER PUBLICATIONS

Pattern Recognition, vol. 22, No. 2, 1989.
Kanemaki, N.; sato, M.; Isoyama, A. *An Integrated Facsimile Mail Service For Office Automation.* IEEE International Conference on Communications '86. Jun. 22–25, 1986; Toronto, Canada; Conference Record vol. 3 of 3; pp. 1514–1519.

*Primary Examiner*—Donald T. Hajec
*Assistant Examiner*—Jeffrey R. Filifek

[57] ABSTRACT

Machine readable electronic domain definitions of part or all of the electronic domain descriptions of hardcopy documents and/or of part or all of the transforms that are performed to produce and reproduce such hardcopies documents are encoded in codes that are printed on such documents, thereby permitting the electronic domain descriptions of such documents and/or such transforms to be recovered more robustly and reliably when the information carried by such documents is transformed from the hardcopy domain to the electronic domain.

19 Claims, 6 Drawing Sheets

HARDCOPY LOSSLESS DATA STORAGE AND COMMUNICATIONS FOR ELECTRONIC DOCUMENT PROCESSING SYSTEMS

This is a continuation of application Ser. No. 07/530,677, filed May 30, 1990 now abandoned.

FIELD OF THE INVENTION

This invention relates to electronic document processing systems and, more particularly, to methods and means for more tightly coupling the usual hardcopy output of such systems to the electronic documents from which the human readable hardcopies are produced. The coupling afforded by this invention may be sufficiently tight to enable printed, human readable hardcopy documents to be employed as an essentially lossless medium for storing and transferring digital electronic documents. Or, such coupling may be utilized to capture otherwise unavailable or not easily discernible information relevant to the reproduction of the electronic source document

BACKGROUND OF THE INVENTION

Modern electronic document processing systems generally include input scanners for electronically capturing the general appearance (i.e., the human readable information content and the basic graphical layout) of human readable hardcopy documents; programmed computers for enabling users to create, edit and otherwise manipulate electronic documents; and printers for producing hardcopy, human readable renderings of electronic documents. These systems typically have convenient access to mass memory for the storage and retrieval of electronic document files. Moreover, they often are networked by local area networks (LANs), switched data links, and the like for facilitating the interchange of digital electronic documents and for providing multi-user access to shared system resources, such as high speed electronic printers and electronic file servers.

The technical details pertaining to the interchangeability of electronic documents are beyond the scope of this invention, but it should be understood that there is not yet an "universal interchange standard" for losslessly interchanging "structured electronic documents" (i.e., documents conforming to predefined rules governing their constituent elements, the characteristics of those elements, and the interrelationships among their elements). Plain text ASCII encoding is becoming a de facto interchange standard, but it is of limited utility for representing structured electronic documents. Other encoding formats provide fuller structural representations of electronic documents, but they usually are relatively system specific. For example, some of the more basic document description languages (DDLs) employ embedded control codes for supplementing ASCII encodings with variables defining the logical structure (i.e., the sections, paragraphs, sentences, figures, figure captions, etc.) of electronic documents, thereby permitting such documents to be formatted in accordance with selected formatting variables, such as selected font styles, font sizes, line and paragraph spacings, margins, indentations, header and footer locations, and columns. Graphical DDL encodings provide more sophisticated and complete representations of electronic document structures because they encode both the logical structure and the layout structure of such documents. Page description language (PDL) encodings are related to graphical DDL encodings, but they are designed so that they can be readily decomposed or interpreted to define the detailed layout of the printed page in a raster scan format. Accordingly, it will be appreciated that the transportability of electronic documents from one document processing system to another depends upon the ability of the receiving or "target" system to interpret, either directly or through the use of a format converter, the encoding format in which the document is provided by the originating or "source" system. To simplify this disclosure, source/target encoding format compatibility will be assumed, but it should be clearly understood that this is a simplifying assumption.

Others previously have proposed printing digital data, including electronic document files, on a recording medium, such as plain paper, so that optical readers can be employed for uploading the data into electronic document processing systems. See, for example, Brass et al U.S. Pat. No. 4,754,127, which issued Jun. 28, 1988 on "Method and Apparatus for Transforming Digitally Encoded Data into Printed Data Strips," and Brass et al U.S. Pat. No. 4,782,221, which issued Nov. 1, 1988 on "Printed Data Strip Including Bit-Encoded Information and Scanner Control." In view of the additional insights provided by the user documentation for "The Laser Archivist," Cauzin Systems, Inc., 1987, it is believed that the so-called "data strips" this prior work has provided are printed as physically distinct entities. Accordingly, the user can use a standard "cut and paste" process for attaching such data strips, if desired, to the human readable renderings of the files to which they pertain. In this system, the scanner used to read the printed data strips is not a general-purpose document scanner, but rather, a special-purpose hand-held computer peripheral optimized for reading said data strips, as specified in Brass et al., U.S. Pat. No. 4,692,603, "Optical reader for printed bit-encoded data and method of reading same," which issued Sep. 8, 1987. Thus this system could not be said to close the loop between common document production and reprographic equipment, as the present invention intends. Drexler U.S. Pat. No. 4,665,004, which issued May 12, 1987 on "Method for Dual Image Recording of Medical Data," also is interesting because it proposes using a specialized optical recording system and recording medium for optically recording the raw digital data for a computer generated pictorial image in a form that permits the raw data (including digitized versions of any optional written or oral annotations) to be physically secured to the human readable, hardcopy rendering of the image. However, that approach has the drawback of requiring the use of different recording mechanisms for producing the machine readable digital data representation and the human readable rendering. Moreover, the digital data is not recorded in a form that permits it to be readily copied using ordinary office equipment.

A commonly assigned J. J. Daniele United States patent which issued Mar. 1, 1988 as U.S. Pat. No. 4,728,984 on "Data Handling and Archiving System" is believed to be especially noteworthy because it relates to the use of an electronic printer for recording digital data on plain paper, together with the use of an input scanner for scanning digital data that has been recorded on such a recording medium to upload the data into the internal computer of the printer. The Daniele '984 patent discusses several subjects which are meaningful to the present invention, including the redundant recording of digital information, the archival storage and distribution of digital data recorded on plain paper, the compression that can be achieved by digitally recording text and graphics, the data security that can be achieved by encrypting digitally recorded text and graphics, Moreover, it discloses a typical printer and a typical input scanner in substantial detail. Therefore, the '984 patent hereby is incorporated by reference.

Paper documents still are a primary medium for written communications and for record keeping. They can be replicated easily by photocopying, they can be distributed and filed in original or photocopied form, and facsimiles of them can be transmitted to remote locations over the public switched telephone network. Paper and other hardcopy documents are so pervasive that they are not only a common output product of electronic document processing systems, but also an important source of input data for such systems.

In recognition of the fundamental role human readable hardcopy documents play in modern society, input scanners have been developed for uploading them into electronic document processing systems. These scanners typically convert the appearance of the hardcopy into a raster formatted, digital data stream, thereby providing a bit mapped representation of the hardcopy appearance. However, bit maps require relatively large amounts of memory and are difficult to edit and manipulate, so substantial effort and expense have been devoted to the development of recognition processes for converting bit mapped document appearances into corresponding symbolic encodings. Unfortunately, recognition processes generally are inferential and of limited scope, so they have difficulty correlating unusual bit map patterns with corresponding encodings and they are prone to making inference errors even when they determine that a correlation exists.

Turning for a moment on the conventional hardcopy output of electronic document processing systems, it will be evident that a hardcopy rendering of an electronic document often is only a partial representation of the content of the corresponding electronic document file. The appearance of a hardcopy rendering is governed by the structure and content of the electronic document to which it pertains, but the digital data encodings which define the structure and content of the electronic document are not explicitly embodied by the rendering. So-called "intelligent" input scanners (scanners equipped with substantial image-processing software) having sufficient knowledge of the structural encoding rules theoretically can recover the structural encodings for at least some types of electronic documents from hardcopy renderings of them, but the practical results frequently do not conform to the theoretical expectations, especially if the hardcopy is distorted (such as by a photocopying or facsimile process), damaged or altered prior to being input scanned.

Furthermore, some types of electronic document data are virtually impossible to infer from a hardcopy rendering. For example, electronic spreadsheets conventionally include computational algorithms for defining the computations which are required to compute the speadsheet, but these algorithms generally are not explicitly set forth in the hardcopy rendering of the computed spreadsheet. Likewise, electronic hypertext documents and multimedia documents ordinarily contain pointers which link them to related electronic documents, but the links provided by those pointers usually are not embodied in the hardcopy renderings of such documents. Still another example is provided by computer generated synthetic graphical images where the control points for the graphical objects that form the image and the data defining the curves which fit those control points normally can only be approximated from a hardcopy rendering of such an image. As still another example, it will be understood that prints generated by computer aided design (CAD) systems typically are approximate representations of the high precision data of the underlying electronic file, which often contains three dimensional information. As a general rule, the mathematical models and the related data from which such a system generates such prints is not fully recoverable from a hardcopy rendering representing any single view. As a further example, it is to be understood that the color values for objects (such as the cyan, magenta, yellow and black values for printed four-color images) also are difficult to ascertain with any substantial certainty from a hardcopy color rendering, and would be impossible to recover from a black & white copy of that color document hardcopy. There are times when documents are printed in black and white as a result of the limited capabilities of the available printer, even though the original electronic source document might have been intended to provide a full color, a functional color, or a highlight color representation. Indeed, even some of the more fundamental attributes of electronic documents, such as their file names, author, creation date, etc., are seldom found in the hardcopy renderings of such documents.

Consequently, it will be evident that it would be a significant improvement if the ordinary hardcopy output of electronic document processing systems could be employed as an essentially lossless media for storing all or part of the structure and content of electronic documents and for transferring that data from the printer of one electronic document processing system to the input scanner of the same or another document processing system. Hardcopy documents of that type would not only continue to function as a convenient medium for distributing and storing human readable renderings of electronic documents, but also would provide a convenient alternative to the digital mass memories which customarily are used for storing electronic documents and to the digital data links and removable digital recording media which normally are employed for transferring electronic documents from one location to another. Furthermore, the integration of machine readable digital representations of electronic documents with human readable renderings of them would permit various combinations of human and computer information processing steps to be employed for processing information more easily and quickly.

SUMMARY OF THE INVENTION

Therefore, in accordance with the present invention, provision is made in electronic document processing systems for printing unfiltered or filtered (i.e., complete or partial, uncompressed or compressed) machine readable digital representations of electronic documents and human readable renderings of them on the same recording media using the same printing process. The integration of machine readable digital representations of electronic documents with the human readable hardcopy renderings of them may be employed, for example, not only to enhance the precision with which the structure and content of such electronic documents can be recovered by scanning such hardcopies into electronic document processing systems, but also as a mechanism for enabling recipients of scanned-in versions of such documents to identify and process annotations that were added to the hardcopies after they were printed and/or for alerting the recipients of the scanned-in documents to alterations that may have been made to the original human readable content of the hardcopy renderings.

In addition to storage of a complete or partial electronic representation of the document and/or its content, this invention may be utilized for encoding information about the electronic representation of the document itself, such as file name, creation and modification dates, access and security information, printing histories. Provision may also be made for encoding information which is computed from the content of the document and other information, for purposes of authentication and verification of document integrity and for computational purposes, such as the recomputation of a spreadsheet. Furthermore, provision may be made for the encoding of information which relates to operations which are to be performed depending on handwritten marks made upon a hardcopy rendering of the document; for example, instructions controlling the action which is to be taken when a box on a document is checked. Still further, this invention may be employed for encoding in the hardcopy another class of information: information about the rendering of the document specific to a single, given hard copy, which can include a numbered copy of that print, the identification of the machine which performed that print, the reproduction characteristics of the printer, the screen frequency and rotation used by the printer in rendering halftones, and the identity or characteristics of the print medium and marking agents (such as the paper and xerographic toner, respectively) Moreover, provision also may be made for encoding information about the digital encoding mechanism itself, such as information given in standard-encoded headers about subsequently compressed or encrypted digital information.

When the electronic document includes a scanned-in image, this invention may be utilized for supplementing the hardcopy rendering of such a document with embedded data characterizing the input scanner and the scan process responsible for inputting the image. Similarly, when a hardcopy is reproduced by a light-lens or electronic copier or a facsimile system, data characterizing the reproduction equipment and process can be embedded in the hardcopy reproduction.

Still another possible application for the present invention relates to augmentation of hardcopy renderings with data defining various active and passive user aids which exist in the electronic document domain. For example, electronic buttons, soft keys, drawing brushes, magnifying tools, phone tools and document feed arrows could be transferred in this way.

As will be appreciated, the supplemental data may be embedded in the hardcopy renderings in a variety of ways. For example, it may be organized hierarchically to ensure the inclusion and robust survival of the more important information. Some or all of the data may be redundantly recorded on the hardcopy renderings to increase it's liklihood of surviving copying and handling. Moreover, the redundantly recorded data may aid in recovering lower priority, non-redundantly recorded data from the human readable content of the rendering, or the hardcopy recorded data may include pointers to sources of backup data should a backup source be required.

BRIEF DESCRIPTION OF THE DRAWINGS

Additional features and advantages of this invention will become apparent when the following detailed description is read in conjunction with the attached drawings, in which.

DETAILED DESCRIPTION OF THE ILLUSTRATED EMBODIMENT

While the invention is described in some detail hereinbelow with specific reference to an illustrated embodiment and certain applications, it is to be understood that there is no intent to limit it to that embodiment or to those applications. On the contrary, the aim is to cover all modifications, alternatives and equivalents falling within the spirit and scope of the invention as defined by the appended claims.

Figure 1A:
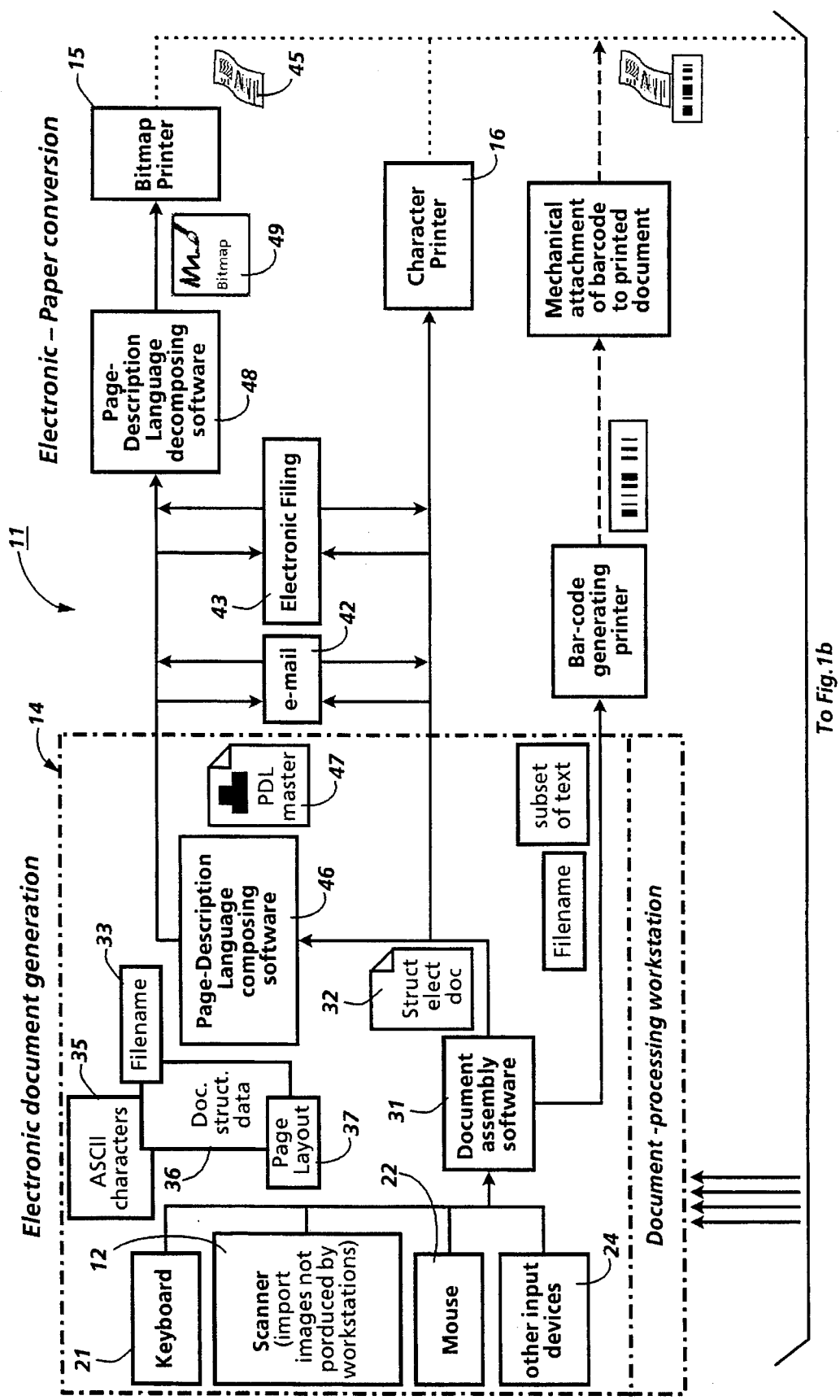
FIGS. 1A and 1B combine to provide a functional schematic diagram of a relatively fully featured, state-of-the-art, electronic document processing system.
Figure 1B:
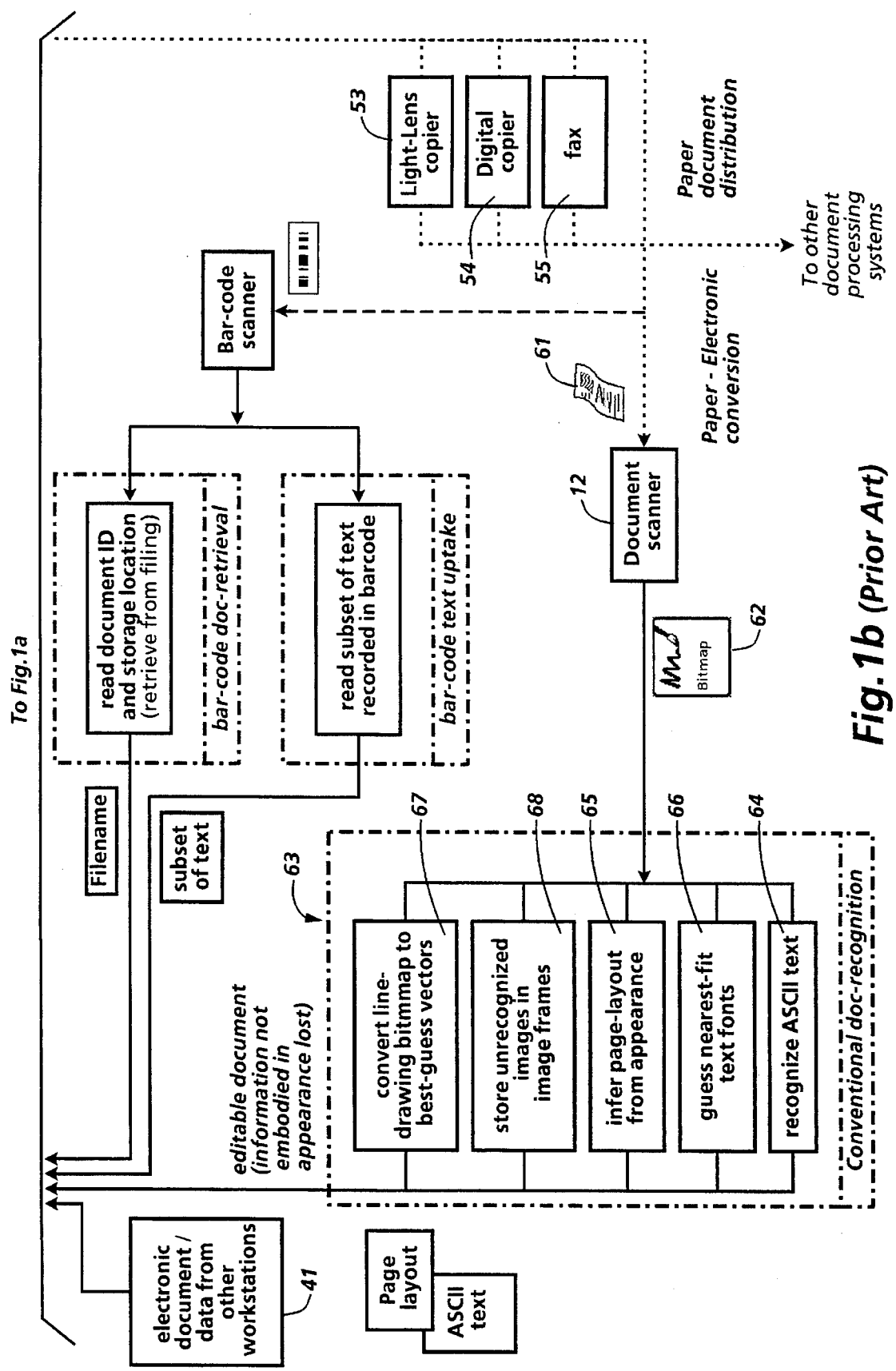

Turning now to the drawings, and at this point especially to FIGS. 1A and 1B, existing electronic document processing systems, such as referenced generally by 11, typically include (i) an input scanner 12 for inputting or "uploading" human readable hardcopy documents (not shown) into the system, (ii) a programmed computer 14, such as a personal computer or a workstation, for creating, editing and manipulating digital electronic documents, and (iii) a bitmap printer 15 and/or a dot matrix or fully formed character printer 16 for outputting or "downloading" human readable hardcopy renderings of electronic documents from the system.

There are a wide variety of known input devices which a user may employ for creating, editing and manipulating electronic documents. For example, a keyboard 21 ordinarily is provided for inputting typographic data, generally together with a predetermined set of control codes. Additionally, a pointing device, such as a mouse 22, commonly is utilized for controlling the positioning of a cursor on a monitor (not shown) that provides the visual feedback which assists the user to interact with the computer 14 effectively. Modern user interfaces, such as the graphical user interfaces that are becoming increasingly popular for personal computers and workstations, often extend the functionality of the mouse-like pointer 22 so that it can be employed, together with a few keystrokes on the keyboard 21, to input a relatively rich and easily extensible set of control codes. There are still other input devices 24, such as stylus sensitive digitizing pads, voice digitizers and video digitizers (not shown), which may be utilized for inputting handwritten data (e.g., free-hand sketches, signatures, etc.), voice annotations and video data into the document processing system 11. Furthermore, as described in some additional detail hereinbelow, the input scanner 12 is available for inputting hardcopy documents, including hardcopy output from the document processing system 11 and from other electronic document processing systems (not shown), as well as hardcopy documents created manually and by other types of marking mechanisms, such as standard typewriters.

Document assembly software 31 residing on the computer 14 interprets the input data and the control codes that are fed into the computer 14 to produce structured electronic documents 32. Each of these electronic documents typically is identified by a locally unique file name 33 which may be assigned to the electronic document 32 by the user, as shown, or by the computer 14 under program control. Typically, the document assembly software 31 is application specific, but the lines between different applications are becoming blurred with the emergence of integrated multi-function software, such a the Xerox Viewpoint environment. For example, in the case of text entered via the keyboard 21, the ASCII encodings 35 of the typographic characters are combined in the document assembly software 31 with control codes to provide DDL encodings for insertion into a structured text file (or, in the case of an electronic document which permits mixed data types, into a text frame) 32. A significant portion of the logical structure of the electronic document 32 usually is explicitly defined by its composition, without requiring any additional intervention by the user. However, provision normally is made for enabling the user to enter document formatting commands, as at 36 and 37, to override the default values which the document assembly software 31 otherwise would employ for defining the layout structure of the document 32.

As is known, structured electronic documents, such as the document 32, can be interchanged between DDL compatible electronic document processing systems, as at 41, through the use of removable digital recording media, such as floppy disks and the like, and through the use of digital data links. Furthermore, networked document processing systems typically are able to interchange electronic documents, either directly by means of a direct file transfer protocol or electronic mail as at 42, or indirectly by means of shared electronic file servers 43.

Hardcopy renderings 45 of locally or remotely produced structured electronic documents 32 can be printed from a DDL encoding by employing, for example, a suitable print driver for driving a standard character printer 16. Alternatively, a PDL encoding of the document 32 may be composed, as at 46, to provide a PDL master 47 which, in turn, can be decomposed, as at 48, to provide an electronic bitmap representation 49 of the document 32 for printing by a bitmap printer 15. PDL masters, such as the master 47, also are structured electronic documents which can be interchanged among PDL compatible electronic document processing systems by means of physically removable recording media as at 41, direct file transfer protocols/electronic mail 42, and shared file servers 43.

Like any other hardcopy document, the hardcopy rendering 45 of an electronic document 32 may be photocopied by a light/lens copier, as at 53, or by a digital copier, as at 54. Additionally, a copy of the rendering 45 may be transmitted to or received from a remote location via facsimile, as a 55. Standard photocopying and facsimile processes tend to cause some distortion of the image, so the copies they produce often are somewhat degraded, especially when the copies are several copy generations removed from the original rendering 45.

As will be understood, the hardcopy input 61 for the input scanner 12 may be the original or a copy of the rendering 45 or of a similar hardcopy rendering from another electronic document processing system (not shown). Or, the input document 61 may be the original or a copy of a document created manually or through the use of a mechanical or electromechanical marking mechanism, such as a standard typewriter and the like. Additionally, the original human readable information content of the document 61 might be supplemented by various annotations and editorial markings. Also, changes may have been made to the original human readable information content of the document 61, with or without any intent to deceive.

In accordance with standard practices, to electronically capture the human readable information content of the document 61, the input scanner 12 first converts the appearance or image of the document 61 into an electronic bitmap 62. Recognition software 63 then usually is employed for converting the bitmap representation 62 into elemental textual and graphical encodings to the extent that the recognition software 63 is able to establish a correlation between elements of the bitmap image 62 and the features it is able to recognize. For example, state-of-the-art recognition software 63 generally can correlate printed typographic characters with their ASCII encodings, as at 64, with substantial success. Additionally, the recognition software 63 sometimes is able to perform some or all of the following tasks: (a) infer some or all of the page-layout features of the document 61 from its bit map representation 62, thereby establishing a basis for supplying page-layout control codes as at 65, (b) make probablistic (e.g. "nearest-fit") determinations with respect to the font or fonts used to print text appearing in the document 61, thereby providing a foundation for supplying font control codes as at 66, and (c) fully or partially decomposing line drawings appearing in the document 61 into "best-guess" vectors, thereby providing a basis for supplying corresponding vector encodings as at 67. However, even with these various recognition tools, the recognition software 63 often is unable to recognize some of the features of the document 61, so it usually also includes provision for inserting the bit maps for unrecognized images into image frames. Therefore, the electronic representation of the document 61 that the document processing system 11 receives from its input scanner 12 typically is composed of probablistic encodings, bit map images, or some combination of those two. Moreover, the input scanner 12 has no mechanism for recovering data relating to the document 61 beyond whatever is inferable from its appearance.

Figure 2A:
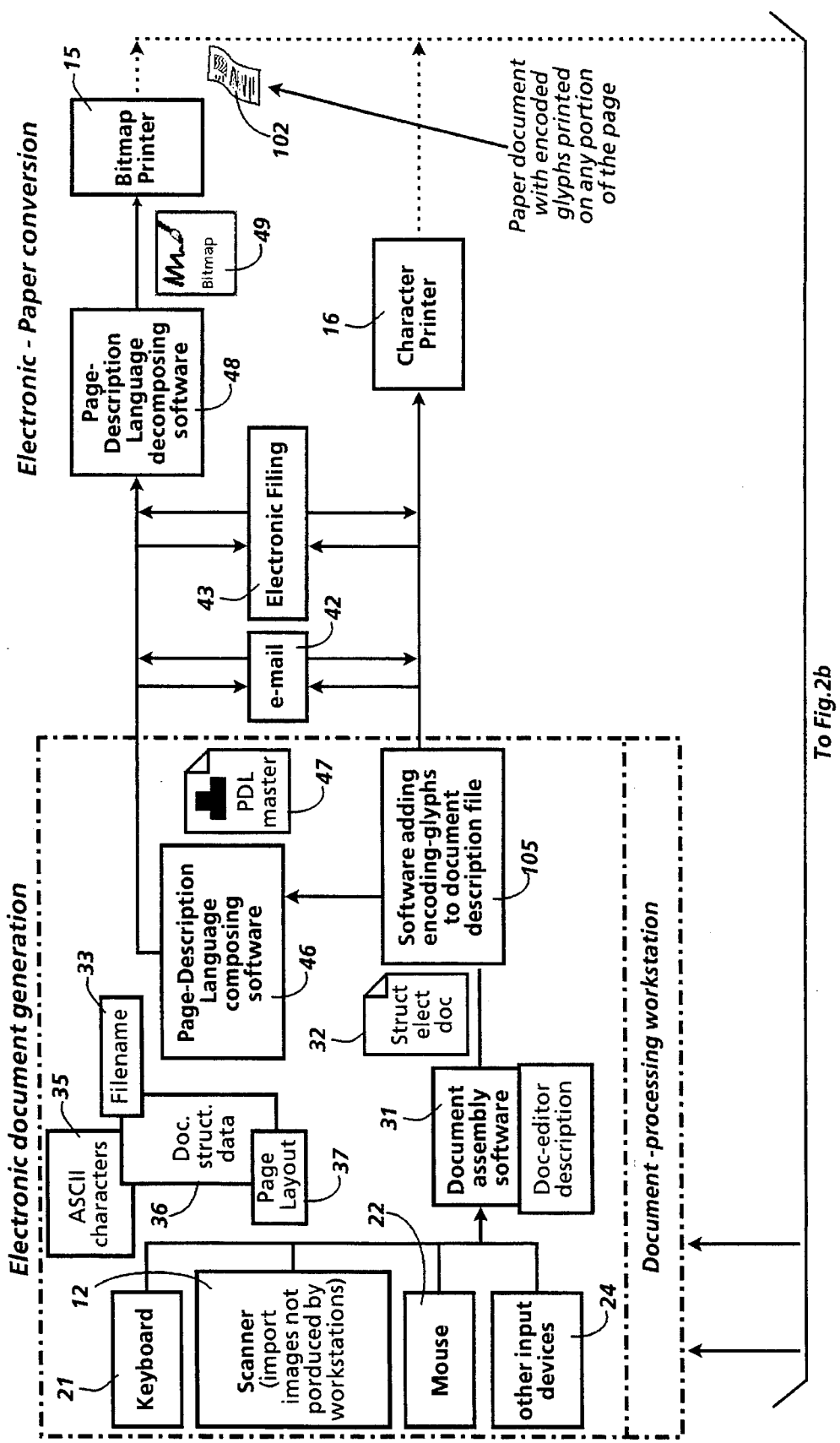
FIGS. 2A and 2B combine to provide another functional schematic diagram for illustrating certain of the enhancements this invention provides for electronic document processing systems of the same general type as shown in FIG. 1.
Figure 2B:
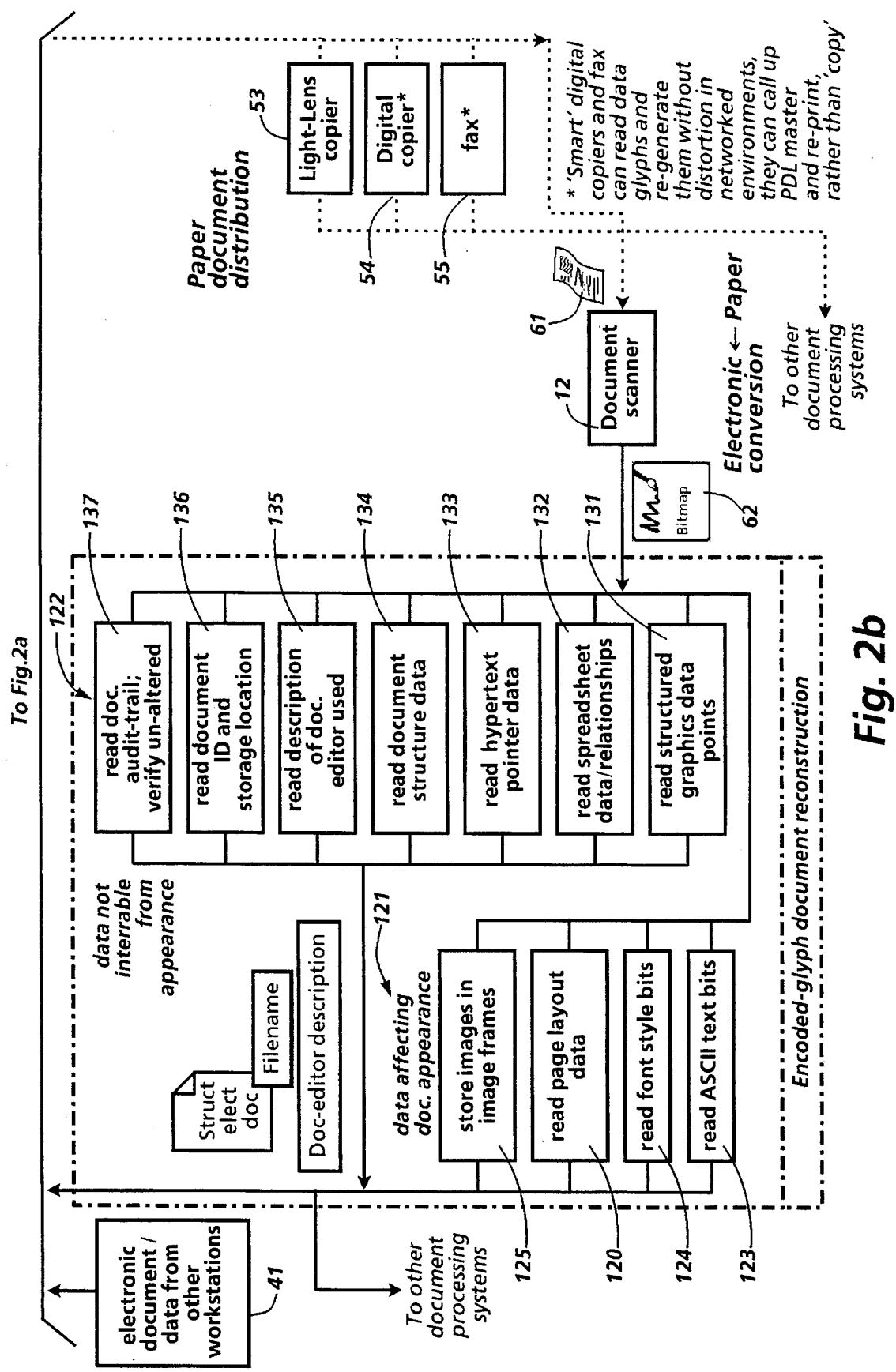

Turning now to FIGS. 2A and 2B, it will be seen that like reference numerals have been used to identify like parts; so the following discussion will focus primarily on the provision that has been made in the electronic document printing system 11A for printing a human readable rendering 45 of an electronic document 32, together with a digital, machine readable representation 101 of that same electronic document 32 on the same recording medium 102 through the use of the same printer 15 or 16. In accordance with this invention, for integrating a digital, machine readable representation 101 of the electronic document 32 with the human readable rendering of it, the bit-level digital data content of the ASCII, DDL or PDL encodings of all or selected portions of the electronic document 32 is encoded at 105 to convert it into "glyph encodings" (encodings representing distinctive markings having at least two distinguishable, machine readable states—viz., a true ("1") state and a false ("0") state). These glyph encodings are then merged into the electronic document description file for the electronic document 32 to cause the glyphs to be printed on the hardcopy output document 102 at one or more selected locations.

As will be appreciated, the printed glyphs may take various forms. For example, they may be binary bar codes composed of black and white markings which, by their presence, absence, or spacing represent the true ("1") and false ("0") states of the data bits. Or, they may be markings which provide two or more levels of machine readable discrimination by virtue of their shape, rotation, density or similar attributes. See the following commonly assigned United States patent applications: D. Bloomberg's application on "Binary Image Processing for Decoding Self-Clocking Glyph Shape Codes," which issued Dec. 1, 1992 as U.S. Pat. No. 5,168,147; R. Tow's application on "Methods and Means for Embedding Machine Readable Digital Data in Halftone Images," which was filed Dec. 27, 1990 as Ser. No. 07/634,990, and R. Tow's application on "Phychophysically Enhanced Techniques for Embedding Machine Readable Digital Data in Grayscale Images," which was filed Dec. 27, 1990 as Ser. No. 07/634,371 now abandoned. The glyphs may be machine readable by means of human invisible characteristics of the print materials, such as their infrared reflectivity, their high resolution spectral detail, their metameric spectral characteristics, or their magnetization. These machine detectable materials may be incorporated into the same printing process that is employed for printing the human readable rendering, such as by utilizing xerographic toners which have machine recognizeable, human invisible characteristics, together with their usual visible characteristics of color, whiteness, blackness, transparency and opacity.

Figure 3:
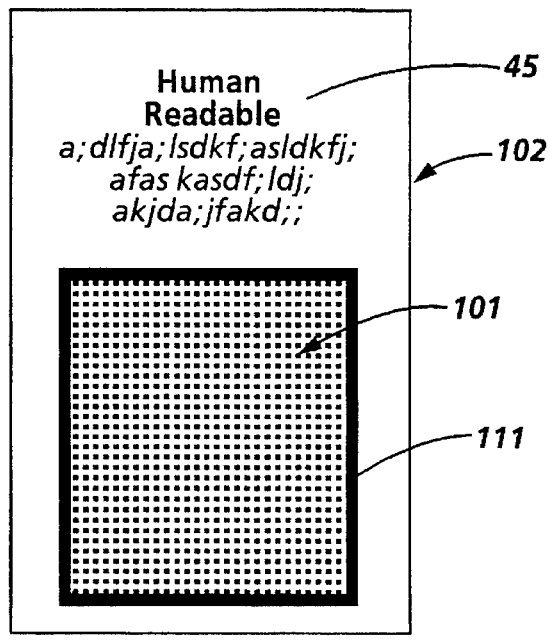
FIGS. 3 and 4 depict digitally augmented documents produced in accordance with this invention.
Figure 4:
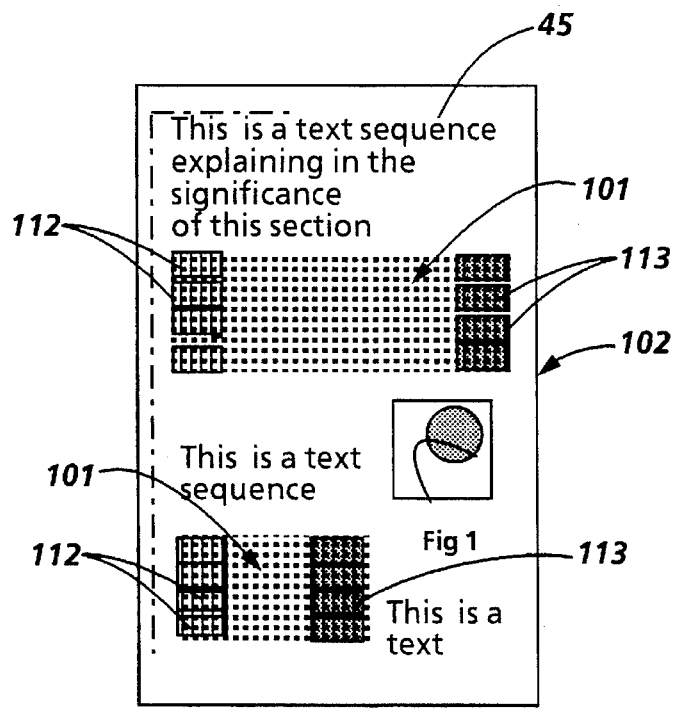

Furthermore, the glyphs may be printed at various locations on the hardcopy document 102. For instance, one or more fields may be set aside in the top, bottom, right-hand or left-hand margins of the document 102 for the printing of such glyphs. Alternatively, as shown in FIGS. 3 and 4, the glyphs may be printed in machine identifiable glyph frames which are fully or partially confined within the margins of the human readable field of the document 102 or fully outside those margins. Glyph frames may be distinguished from any human readable information with which they are intermixed, such as by causing the printer 15 or 16 to mark their boundaries with a distinctive, machine recognizeable border pattern as at 111 in FIG. 3 or by printing each line of glyphs between machine recognizeable "start" codes and "end" codes as at 112 and 113, respectively, in FIG. 4. Still another option is to print the glyphs in a predetermined region on the document 102 using a machine recognizeable attribute of the printing process or of the glyph pattern to distinguish the glyphs from human readable information that is printed within the same region of the document. For instance, the glyph patterns may be machine distinguishable by the shape and periodic placement of the glyphs. Moreover, patterns of fine scale glyphs may be organized to create human readable markings on a coarser scale, such as text, logos, decorative frames, and background settings.

In keeping with this invention, all or only selected portions of the ASCII, DDL or PDL digital encodings of the electronic document 32 may be printed on the hardcopy document 102. Furthermore, the digital representation of the electronic document that is printed on the hardcopy 102 may be utilized in lieu of or to augment the recognition software 63 (FIG. 1) for uploading an editable copy of the electronic document 32 into the document processing system 11A. More particularly, if all of the digital data contained by the electronic document 32 is printed in digital data form on the hardcopy 102, the electronic document 32 can be recovered merely by employing the input scanner 12 for scanning the glyph encoded data to recover the data that affects the appearance of the document, as at 121, as well as the data that is not inferrable from the appearance of the document, as at 122. For example, the appearance related data that may be recovered at 121 includes the ASCII text bits as at 123, the font style bits as at 124, and the page layout data as at 124: all of which may read out directly from the glyph encoded data for application to the workstation 14, without any intermediate processing. Appearance related image data (i.e. bits maps) also can be recovered from glyph encoded data embedded in the hardcopy document 102, but such image data is stored in an image frame, as at 125, for application to the workstation 12 in order to allow optimal uptake of the image frame (for example, information about the screen frequency and rotation of halftoned images can aid in their conversion for subsequent reformatting, displaying and printing avoiding the degradation in image quality normally occurring in electronic re-screening).

In short, this invention provides a less error prone alternative to employing conventional recognition techniques for recovering the digital data defining the recognizeable features of the human readable, hardcopy rendering of the electronic source document 32. However, even if conventional recognition techniques are employed for recovering the digital data defining some or all of those features, it will be evident that this invention enables data which is potentially important to the accuracy and/or completeness of the reconstruction of the electronic source document 32 to be recovered, even if such data is not evident or inferable from the appearance of the human readable rendering of the source document. For example, the glyph encoded data that is embedded in the hardcopy document 102 may include one or more of the following: machine readable descriptions of the data points for structured graphics as at 131, machine readable descriptions of the algorithms utilized for performing computations for spreadsheets and the like as at 132, machine readable descriptions of hypertext pointer values as at 133, machine readable descriptions of some or all of the structural characteristics of the electronic source document as at 134, machine readable descriptions of the document editor used to prepare the source document 32, as at 135, machine readable descriptions of the file name and storage location of the electronic source document 32, as at 136, and machine readable descriptions of audit-trail data for the electronic source document 32, as at 137.

As will be appreciated, the foregoing examples of the types of digital data which this invention permits to be stored on and recovered from the hardcopy output of electronic document processing systems is not exhaustive. For instance, in color systems it may be desireable to digitally record the color values (typically, cyan, magenta, yellow and black) for the pixels of the human readable hardcopy rendering so that those values can be reliably recaptured from the hardcopy. As still another example, it may be desireable to record data identifying the toner and/or the fonts employed for printing a xerographic rendering of an electronic document to assist a document recognition system with the interpretation of such a rendering. In other words, this invention may be utilized for storing and communicating a machine readable description of all or any selected part of the electronic source document 32, as well as a like description of the equipment and process employed for producing the source document 32 and the human readable rendering 45 of it. Moreover, such digital data descriptions can be redundantly recorded if desired (assuming that adequate space is available on the hardcopy document 102 for such redundant recording), thereby reducing the risk that critical data will be lost as a result of the ordinary wear and tear the hardcopy 102 may experience.

Figure 5:
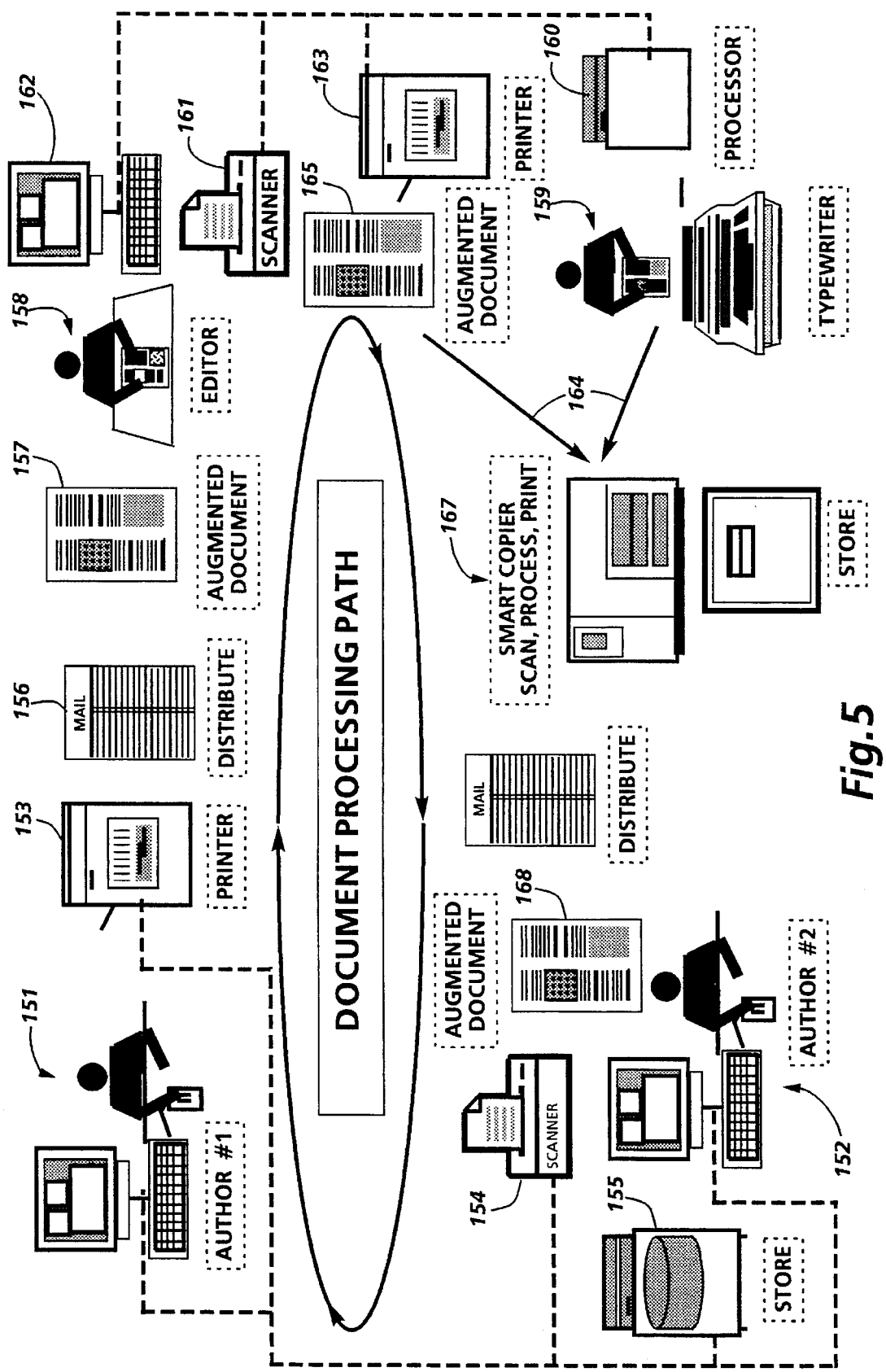
FIG. 5 illustrates some of the document processing applications and work-ways which are facilitated by this invention.

FIG. 5 schematically illustrates a few of the work ways that are enabled by this invention. Colloborating authors 151 and 152 may exchange document drafts electronically or in hardcopy form, using ordinary print facilities 153, input scanning facilities 154 and mass storage facilities 155. Such documents can be printed to include digitally embedded data descriptions and can be distributed by mail, as at 156, in digitally augmented hardcopy document form 157 to an editor 158, where the electronic document can be recaptured with substantial fidelity by an input scanner 161 for editing on a workstation 162. When the editor 158 is finished with the document (or when an editorial assistant or typist 159 is finished with it, such as in a workgroup utilizing a shared processing node 160), the document may be reprinted by a printer 163 for further distribution in hardcopy form, as at 164, but it may now be further augmented, as at 165, with data describing the some or all of the editorial actions that have been taken. During this or any of the other phases of the "hardcopy" distribution process, the document 165 may pass through various "smart" copying processes, facsimile processes, scanning processes and printing processes, as at 167, during which data describing those processes may be added to it before it is returned to the original author or authors in hardcopy form, as at 168, to be electronically recaptured by them through the use of the input scanner 154.

Conclusion

In view of the foregoing, it will be appreciated that the present invention provides relatively straightforward and reliable methods and means for capturing and communicating, in fully integrated hardcopy form, digital data describing the structure and content of the electronic source document underlying a human readable hardcopy rendering of the electronic document, as well as digital data defining the equipment and process employed to prepare the source document and to produce the rendering. Furthermore, it will be evident that the types of digital data which may be captured and communicated in accordance with this invention may be determined to satisfy the requirements of various applications and operating environments and may vary significantly from case-to-case.

What is claimed:

1. In an electronic document processing system for transferring information back and forth between an electronic domain and a hardcopy domain; said system including computer means for operating upon and storing electronic document files in a machine readable format in said electronic domain, input scanner means coupled to said computer means for transforming information from hardcopy documents in said hardcopy domain to said electronic domain, and printer means coupled to said computer means for printing human readable renderings of selected ones of said files on hardcopy documents; the improvement comprising an interface means between said computer means and said printer means for encoding at least one attribute of each of said selected electronic document files in a machine readable code that said printer means prints on said hardcopy documents along with the human readable renderings of the respective files; said attribute of each file being content of said file that is defined in said electronic domain but not explicitly defined by the human readable rendering of said file that is printed by said printer means, whereby said attribute of each of said selected electronic document files is recoverable from the code printed on a corresponding hardcopy document when information carried by said corresponding hardcopy document is transformed from said hardcopy domain to said electronic domain, even when such an attribute is irrecoverable from the human readable rendering.

2. The improvement of claim 1 wherein the attributes encoded in said code include machine readable electronic domain definitions of at least selected portions of the human readable renderings that said printer means prints on the respective hardcopy documents.

3. The improvement of claim 2 wherein the attributes encoded in said code include complete machine readable electronic domain definitions of the human readable renderings that said printer means prints on the respective hardcopy documents.

4. The improvement or claim 1 wherein the attributes encoded in said code include a machine readable electronic domain definition of at least a first attribute of said electronic document files that is incapable of being inferred reliably from said human readable renderings.

5. The improvement of claim 4 wherein said first attribute relates to at least one structural characteristic of said electronic document files.

6. The improvement of claim 5 wherein said electronic document files are encoded in accordance with predetermined structural encodings, and said first attribute defines such encodings.

7. The improvement of claim 4 wherein said first attribute relates to at least one operation performed by said electronic processing system for producing said electronic document files.

8. The improvement of claim 4 wherein said first attribute relates to at least one operation performed by said electronic processing system for processing scanned-in representations of said electronic document files.

9. The improvement of claim 1 wherein said renderings are composed of at least two colors, and the data embedded in said renderings quantitatively defines compositional values of each of said colors for at least selected portions of said renderings.

10. The improvement of any of claims 2–9 wherein at least some of said code is compressed in accordance with a predetermined compression algorithm, and another portion of said specifies a decompression algorithm for decompressing the compressed.

11. The improvement of any of claims 2–9 wherein at least some of said code is encrypted, and another portion of said code defines a key for decrypting the encrypted code.

12. The improvement of any of claims 2–9 wherein multiple copies of said code are redundantly printed on said hardcopy documents, thereby enabling such a scanner to recover said from any one of said copies.

13. The improvement of claim 1 wherein the attributes encoded in said code enables such a computer means to authenticate scanned-in electronic domain representations of said renderings.

14. In an electronic document processing system having scanner means for transforming information from a hardcopy domain to an electronic domain, and rendering means for transferring representations of human readable information from sources in at least one-of said domains to hardcopy documents in said hardcopy domain in accordance with a transform having known attributes, including system attributes which are not explicitly defined by said human readable information; the improvement comprising means within said rendering means for printing a machine readable encoded description of at least one of the known system attributes, including system attributes which are not explicitly defined by said human readable information of said transform on said hardcopy documents along with said human readable information, such that at least one of said system attributes of said transform is stored on said hardcopy documents for retrieval when any of said hardcopy documents is transformed from said hardcopy domain to said electronic domain.

15. The improvement of claim 14 wherein said rendering means includes a printer for performing a printing process, and said encoded description defines at least one attribute of said printing process.

16. The improvement of claim 14 wherein said renderings are composed of at least two colors, and said encoded description quantitatively defines compositional values of each of said colors for at least selected portions of said human readable information.

17. The improvement of any of claims 14 or 16 wherein one part of said encoded description is encrypted, and another portion of said encoded description defines a key for decrypting said one part of said description.

18. The improvement of any of claims 14 or 16 wherein at least one part of said encoded description is compressed in accordance with a predetermined compression algorithm.

19. The improvement of any of claim 18 wherein another part of said encoded description specifies a decompression algorithm for decompressing said one part of said description.

* * * * *